(12) United States Patent
Tomaschke

(10) Patent No.: US 11,872,532 B2
(45) Date of Patent: Jan. 16, 2024

(54) ULTRAFILTRATION MEMBRANES FOR DAIRY PROTEIN SEPARATION

(71) Applicant: Campbell Membrane Technologies, Inc., El Cajon, CA (US)

(72) Inventor: John E. Tomaschke, San Diego, CA (US)

(73) Assignee: Campbell Membrane Technologies, Inc., El Cajon, CA (US)

( * ) Notice: Subject to any disclaimer, the term of this patent is extended or adjusted under 35 U.S.C. 154(b) by 471 days.

(21) Appl. No.: 17/272,905

(22) PCT Filed: Sep. 4, 2019

(86) PCT No.: PCT/US2019/049575
§ 371 (c)(1),
(2) Date: Mar. 2, 2021

(87) PCT Pub. No.: WO2020/051229
PCT Pub. Date: Mar. 12, 2020

(65) Prior Publication Data
US 2021/0178341 A1 Jun. 17, 2021

Related U.S. Application Data

(60) Provisional application No. 62/727,368, filed on Sep. 5, 2018.

(51) Int. Cl.
| | | |
|---|---|---|
| *B01D 71/08* | (2006.01) | |
| *B01D 61/14* | (2006.01) | |
| *B01D 69/02* | (2006.01) | |
| *B01D 71/82* | (2006.01) | |
| *B01D 71/68* | (2006.01) | |

(52) U.S. Cl.
CPC ........... *B01D 71/68* (2013.01); *B01D 61/145* (2013.01); *B01D 69/02* (2013.01); *B01D 71/82* (2013.01); *B01D 2325/14* (2013.01)

(58) Field of Classification Search
CPC ...... B01D 71/68; B01D 61/145; B01D 69/02; B01D 71/82; B01D 2325/14
USPC ............................................. 210/500.41, 653
See application file for complete search history.

(56) References Cited

U.S. PATENT DOCUMENTS

| | | | |
|---|---|---|---|
| 5,194,159 A | * | 3/1993 | George .................... C07C 29/76 |
| | | | 210/500.41 |
| 5,364,454 A | | 11/1994 | Bikson et al. |
| 7,160,927 B2 | | 1/2007 | Schindler et al. |
| 2009/0203806 A1 | | 8/2009 | Liu et al. |
| 2011/0268901 A1 | | 11/2011 | Handlin et al. |
| 2012/0178834 A1 | | 7/2012 | Linder et al. |
| 2012/0223010 A1 | | 9/2012 | Mickols et al. |
| 2012/0225960 A1 | | 9/2012 | Mickols et al. |
| 2013/0203873 A1 | | 8/2013 | Linder et al. |
| 2014/0234506 A1 | | 8/2014 | Etzel et al. |
| 2015/0314245 A1 | | 11/2015 | Nakao et al. |

FOREIGN PATENT DOCUMENTS

| | | |
|---|---|---|
| EP | 0142973 | 12/1988 |
| GB | 1473857 | 12/1975 |
| KR | 1996-0003152 B1 * | 3/1996 |
| WO | WO 2008/103599 A2 | 8/2008 |
| WO | WO 2017/153409 A1 | 9/2017 |

OTHER PUBLICATIONS

Machine-generated English translation of KR-960003152-B1, generated on Aug. 10, 2023.*
Ko, et al. (2015) "Cross-Linked Sulfonated Poly(arylene ether sulfone) Membranes Formed by in Situ Casting and Click Reaction for Applications in Fuel Cells," Macromolecules 48(4):1104-1114.
Li, et al. (2016) "The effect of sulfonated polysulfone on the compatibility and structure of polyethersulfone-based blend membranes," Journal of Membrane Science 513: 1-11.
Noordegraaf and Smolders (1982) "Preparation and Properties of a Composite Charged Membrane," Desalination 41: 249-261.
Zheng, et al. (2018) "Enhanced antifouling and antibacterial properties of poly(ether sulfone) membrane modified through blending with sulfonated poly (aryl ether sulfone) and copper nanoparticles," Applied Surface Science 434: 806-15.
International Search Report and Written Opinion issued by the International Search Authority dated Mar. 12, 2020 for International Application No. PCT/2019/049575, filed on Sep. 4, 2019, and published as WO 2020/051229 dated Mar. 12, 2020 (Applicant—Campbell Membrane Technologies, Inc.) (10 pages).
U.S. Appl. No. 62/727,368, filed Sep. 5, 2019, John E. Tomaschke (Campbell Membrane Technologies, Inc.).
PCT/2019/049575 (WO 2020/051229), Sep. 4, 2019 (Mar. 12, 2020) John E. Tomaschke (Campbell Membrane Technologies, Inc.).

* cited by examiner

*Primary Examiner* — Fred Prince
(74) *Attorney, Agent, or Firm* — Ballard Spahr LLP

(57) ABSTRACT

The present disclosure is concerned with negatively charged filtration membranes and methods of making and using same, for example, in the concentration and/or filtration of dairy products. This abstract is intended as a scanning tool for purposes of searching in the particular art and is not intended to be limiting of the present invention.

20 Claims, No Drawings

ULTRAFILTRATION MEMBRANES FOR DAIRY PROTEIN SEPARATION

CROSS-REFERENCE TO RELATED APPLICATIONS

This Application is a national stage filing under 35 U.S.C. § 371 of International Application No. PCT/US2019/049575, filed on Sep. 4, 2019, which claims the benefit of U.S. Application No. 62/727,368, filed on Sep. 5, 2018, the contents of which are incorporated herein by reference in their entireties.

BACKGROUND

Milk concentrates are a common way of making the proteins and nutrients of milk available for nutritional uses, particularly where storage or transport of milk may be impractical, for example, due to its' weight, volume, or rapid perishability. Milk proteins are a particularly valued nutritional supplement, used in a variety of nutritional applications and as ingredients in many processed and prepared foods.

Effectively concentrating milk components to obtain concentrated protein products typically involves separating casein and/or whey from smaller molecular weight components of milk using ultrafiltration membranes. Specifically, sufficient pressure is applied to the milk to force water and low molecular weight components through the porous membrane filter (the permeate) while the proteins, fat, and insoluble minerals are retained (the retentate). This typically results in a milk protein concentration that is two- to five-fold greater than the starting milk.

Uncharged ultrafiltration membranes are traditionally used to concentrate dairy proteins. In order to prevent loss of protein by passage through the membranes, membranes having a small pore size are often selected; however, these membranes have low flow rates per unit area (i.e., a low flux). Conversely, membranes with larger pore sizes can operate at higher flux, but at the expense of higher losses of protein. Thus, there remains a need for filtration membranes having high flux and low losses that can be useful in, for example, the concentration of dairy proteins.

SUMMARY

In accordance with the purpose(s) of the invention, as embodied and broadly described herein, the invention, in one aspect, relates to filtration membranes and methods of making and using same.

Disclosed are method comprising the steps of: (a) sulfonating a first poly(aryl ether) to provide a sulfonated poly(aryl ether); (b) combining the sulfonated poly(aryl ether) and a second poly(aryl ether) to provide a casting solution; and (c) casting the solution to provide a filtration membrane, wherein the sulfonated poly(aryl ether) is not isolated prior to casting the membrane.

Also disclosed are membranes produced by a disclosed method.

Also disclosed are methods comprising filtering a dairy product through a disclosed membrane or a membrane produced by a disclosed method, to provide a permeate and a retentate.

Also disclosed are reconstituted dairy products produced by a disclosed method.

Also disclosed are permeates produced by a disclosed method.

Also disclosed are retentates produced by a disclosed method.

Also disclosed are methods comprising the steps of: (a) sulfonating polyether sulfone to provide sulfonated polyether sulfone, wherein sulfonating is performed with fuming sulfuric acid in sulfolane; (b) combining the sulfonated polyether sulfone and polyether sulfone in N-methyl-2-pyrrolidinone and sulfolane with concentrated sulfuric acid to provide a casting solution; and (c) casting the solution to provide an ultrafiltration membrane, wherein sulfonated polyether sulfone is not isolated prior to casting the ultrafiltration membrane.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

As used in the specification and in the claims, the term "comprising" can include the aspects "consisting of" and "consisting essentially of."

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

References to parts by weight of a particular component in a composition, whether in the specification or subsequent claims, expresses the weight relationship between the component and any other components in the composition or article for which a part by weight is described. For example, in a composition containing 1 part by weight of component A and 2 parts by weight component B, A and B are present in a weight ratio of 1:2 and exist in this ratio regardless of whether additional components are present in the composition.

A weight percent (wt. % or wt %) of a component, unless stated specifically to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "polyarylethersulfone" (PAE) refers to a linear aromatic polymer comprising both ether and sulfone linkages. For example, the polymers synthesized from the monomers 4-chlorophenylsulfone with 4,4'-isopropylidene diphenol (polysulfone "PS") and the former monomer with 4,4'-sulfonyl diphenol (polyethersulfone "PES") are included.

As used herein, the term "sulfonated polyarylethersulfone" (SPAE) refers to the same polymers described above which have been given a chemical modification consisting of an added sulfonic acid (or sulfonic acid salt) group. The designations SPS and SPES represent the sulfonated analogs of the aforementioned PS and PES polymers, respectively. The amount of sulfonic acid groups contained in a particular polymer is indicated by the ion exchange capacity (IEC) and is expressed in units of milliequivalents per gram of polymer (meq/g).

As used herein, solvents relate to their ability to either completely dissolve or partially dissolve the PAE and SPAE polymers depending upon their dissolving strength. In general, a "strong solvent" is one which is capable of completely dissolving at least about 10% by wt. polymer(s) at ambient temperature. A "weak solvent" by contrast, is one which is compatible with the polymer(s) solution in a strong solvent but by itself is capable of dissolving less than about 10%.

As used herein, "additional components" refer to those compounds which are not needed for creating a polymer(s) solution but which may affect another beneficial outcome. For example, certain weak solvents, non-solvents, and salts may affect the resultant UF membrane pore morphology in a desired way. Other examples include compounds which enhance precipitation of the more soluble SPAE polymer. These compounds are thus called "precipitation enhancement agent" and will be discussed in greater detail in the specification.

As used herein, the term "casting" refers to the mechanical process of applying the polymer(s) solution ("casting solution") to a polyester paper web or other similar web material using a precisely gapped knife blade or other metering device to give an even, thin layer which is then conveyed through a series of water baths. The first bath, the coldest temperature ("quench bath") is the most critical in the "phase inversion" process in which solvents of the polymer(s) solution are exchanged with the precipitant water, leaving behind an "anisotropic" porous UF membrane. This anisotropic property refers to the varied pore size and shape between the exposed top side (smallest pores) and bottom side (largest pores). Subsequent ambient and hot water baths are needed for gradual removal of residual solvents from the UF membrane.

As used herein, "cross-flow" testing of UF membranes involves a pressurized feed flowing across the active (top side) of the flat membrane sample such that this flow rate is greater than the permeate flow out so as to prevent a build-up of dairy protein on the membrane surface. The test pressure recorded is taken as the average of the inlet (feed) pressure and the outlet (concentrate) pressure. Due to some normal variance in the day to day testing of the average of these two pressures, pressure is "normalized" to a lower value so that permeate rates from different test days may be compared. For example, typical inlet/outlet pressure average is 32 psi, so the final permeate flow rates are calculated at a normalized pressure of 27 psi.

B. Methods for Making a Filtration Membrane

In one aspect, disclosed are methods comprising the steps of: (a) sulfonating a first poly(aryl ether) to provide a sulfonated poly(aryl ether); (b) combining the sulfonated poly(aryl ether) and a second poly(aryl ether) to provide a casting solution; and (c) casting the solution to provide a filtration membrane, wherein the sulfonated poly(aryl ether) is not isolated prior to casting the membrane.

In one aspect, disclosed are methods comprising the steps of: (a) sulfonating polyether sulfone to provide sulfonated polyether sulfone, wherein sulfonating is performed with fuming sulfuric acid in sulfolane; (b) combining the sulfonated polyether sulfone and polyether sulfone in N-methyl-2-pyrrolidinone and sulfolane with concentrated sulfuric acid to provide a casting solution; and (c) casting the solution to provide an ultrafiltration membrane, wherein sulfonated polyether sulfone is not isolated prior to casting the ultrafiltration membrane.

Examples of filtration membranes that can be prepared using a disclosed method include, but are not limited to, microfiltration (MF), ultrafiltration (UF), reverse osmosis (RO), and nanofiltration (NF) membranes. In a further aspect, the filtration membrane is an ultrafiltration membrane.

In a further aspect, sulfonating is performed with an acid. In a still further aspect, the acid is sulfuric acid. In yet a further aspect, sulfonating is performed with fuming sulfuric acid in sulfolane.

In various aspects, sulfonating is terminated via addition of a solvent such as, for example, N,N-dimethylformamide, N,N-dimethylacetamide, N-methyl-2-pyrrolidinone, N-ethyl-2-pyrrolidinone, and dimethylsulfoxide, and mixtures thereof. In a further aspect, the solvent is the same as the first solvent. In a still further aspect, the solvent is different than the first solvent.

In a further aspect, the acid is present in an amount of from about 5 wt % to about 75 wt %, based on the combined total weight of the acid and the first poly(aryl ether). In a still further aspect, the acid is present in an amount of from about 5 wt % to about 50 wt %, from about 5 wt % to about 35 wt %, from about 5 wt % to about 20 wt %, from about 5 wt % to about 10 wt %, from about 10 wt % to about 75 wt %, from about 20 wt % to about 75 wt %, from about 35 wt % to about 75 wt %, or from about 50 wt % to about 75 wt %.

In a further aspect, combining is performed in a first solvent. Examples of first solvents include, but are not limited to, N,N-dimethylformamide, N,N-dimethylacetamide, N-methyl-2-pyrrolidinone, N-ethyl-2-pyrrolidinone, and dimethylsulfoxide, and mixtures thereof. In a still further aspect, the first solvent is N-methyl-2-pyrrolidinone.

In a further aspect, combining is performed in a first and second solvent (i.e., combining is further performed in a second solvent). Examples of second solvents include, but are not limited to, diethylene glycol dimethyl ether, sulfolane, and triethyl phosphate, and mixtures thereof. In yet a further aspect, the second solvent is sulfolane.

In a further aspect, combining is further performed with sulfuric acid (i.e., combining is performed in a first and second solvent with sulfuric acid). In a still further aspect, the sulfuric acid is present in an amount of from about 0.1 wt % to about 10 wt %, based on the total weight of the casting solution. In yet a further aspect, the sulfuric acid is present in an amount of from about 0.1 wt % to about 7 wt %, from about 0.1 wt % to about 5 wt %, from about 0.1 wt % to about 3 wt %, from about 0.1 wt % to about 1 wt %, from about 1 wt % to about 10 wt %, from about 3 wt % to about 10 wt %, from about 5 wt % to about 10 wt %, or from about 7 wt % to about 10 wt %. In yet a further aspect, the sulfuric acid is present in an amount of about 0.1 wt %, about 1 wt %, about 3 wt %, about 5 wt %, about 7 wt %, or about 10 wt %.

In various aspects, the second poly(aryl ether) is dissolved in a solvent such as, for example, N,N-dimethylformamide, N,N-dimethylacetamide, N-methyl-2-pyrrolidinone, N-ethyl-2-pyrrolidinone, dimethylsulfoxide, or mixtures thereof, prior to the combining step. In a further aspect, the solvent is the same as the first solvent. In a still further aspect, the solvent is different than the first solvent. In yet a further aspect, the second poly(aryl ether) is at least 50%, at least 60%, at least 70%, at least 80%, at least 90%, at least 95%, or at least 99% dissolved in a solvent prior to the combining step.

In a further aspect, casting is phase inversion casting.

1. Sulfonated Poly(Aryl Ethers)

In one aspect, disclosed are methods comprising the step of sulfonating a first poly(aryl ether) to provide a sulfonated poly(aryl ether) (SPAE).

In a further aspect, the sulfonated poly(aryl ether) is either sulfonated polysulfone or sulfonated polyether sulfone, and the second poly(aryl ether) is either polysulfone or polyethersulfone.

In a further aspect, the sulfonated poly(aryl ether) is present in an amount of from about 0.1 wt % to about 30 wt %, based on the total weight of the casting solution. In a still further aspect, the sulfonated poly(aryl ether) is present in an amount of from about 0.1 wt % to about 25 wt %, from about 0.1 wt % to about 20 wt %, from about 0.1 wt % to about 15 wt %, from about 0.1 wt % to about 10 wt %, from about 0.1 wt % to about 5 wt %, from about 1 wt % to about 30 wt %, from about 5 wt % to about 30 wt %, from about 10 wt % to about 30 wt %, from about 15 wt % to about 30 wt %, from about 20 wt % to about 30 wt %, or from about 25 wt % to about 30 wt %. In yet a further aspect, the sulfonated poly(aryl ether) is present in an amount of about 0.1 wt %, about 1 wt %, about 3 wt %, about 5 wt %, about 10 wt %, about 15 wt %, about 20 wt %, about 25 wt %, or about 30 wt %.

In a further aspect, the sulfonated poly(aryl ether) has an ion exchange capacity (IEC) of from about 0.1 meq/g to about 5.0 meq/g. In a still further aspect, the sulfonated poly(aryl ether) has an ion exchange capacity of from about 0.1 meq/g to about 4.0 meq/g, from about 0.1 meq/g to about 3.0 meq/g, from about 0.1 meq/g to about 2.0 meq/g, from about 0.1 meq/g to about 1.0 meq/g, from about 1.0 meq/g to about 5.0 meq/g, from about 2.0 meq/g to about 5.0 meq/g, from about 3.0 meq/g to about 5.0 meq/g, or from about 4.0 meq/g to about 5.0 meq/g.

In a further aspect, the sulfonated poly(aryl ether) comprise a repeating unit having a phenyl group, wherein at least one phenyl group is substituted with a sulfonic acid group. In a still further aspect, the sulfonated poly(aryl ether) comprise a repeating unit having a phenyl group, wherein one phenyl group is substituted with a sulfonic acid group.

In yet a further aspect, the sulfonated poly(aryl ether) comprise a repeating unit having a phenyl group, wherein more than one phenyl group is substituted with a sulfonic acid group.

In a further aspect, the sulfonic acid group has a formula —SO$_3$R$^1$, wherein R$^1$ is selected from hydrogen, an alkali metal salt, and a nitrogen-containing salt derived from ammonium or amine. In a still further aspect, R$^1$ is selected from hydrogen and an alkali metal salt. In yet a further aspect, R$^1$ is selected from hydrogen and a nitrogen-containing salt derived from ammonium or amine. In an even further aspect, R$^1$ is an alkali metal salt. In a still further aspect, R$^1$ is a nitrogen-containing salt derived from ammonium or an amine. In yet a further aspect, R$^1$ is a nitrogen-containing salt derived from ammonium. In an even further aspect, R$^1$ is a nitrogen-containing salt derived from an amine. In a still further aspect, R$^1$ is hydrogen.

In a further aspect, from about 0.01 to about 1.0 molar groups of the phenyl group are substituted with a sulfonic acid group. In a still further aspect, from about 0.01 to about 1.0 molar groups, from about 0.01 to about 0.5 molar groups, from about 0.01 to about 0.1 molar groups, from about 0.01 to about 0.05 molar groups, from about 0.05 to about 1.0 molar groups, from about 0.1 to about 1.0 molar groups, or from about 0.5 to about 1.0 molar groups of the phenyl group are substituted with a sulfonic acid group.

2. First and Second Poly(Aryl Ethers)

In one aspect, disclosed are methods comprising the step of combining the sulfonated poly(aryl ether) and a second poly(aryl ether) (PAE) to provide a casting solution.

In a further aspect, the first poly(aryl ether) and the second poly(aryl ether) are independently selected from polysulfone and polyethersulfone. In a still further aspect, the first poly(aryl ether) and the second poly(aryl ether) are the same. In yet a further aspect, the first poly(aryl ether) and the second poly(aryl ether) are different. In an even further aspect, each of the first poly(aryl ether) and the second poly(aryl ether) is polyether sulfone.

In a further aspect, the second poly(aryl ether) is present in an amount of from about 5 wt % to about 30 wt %, based on the total weight of the casting solution. In a still further aspect, the second poly(aryl ether) is present in an amount of from about 5 wt % to about 25 wt %, from about 5 wt % to about 20 wt %, from about 5 wt % to about 15 wt %, from about 5 wt % to about 10 wt %, from about 10 wt % to about 30 wt %, from about 15 wt % to about 30 wt %, from about 20 wt % to about 30 wt %, or from about 25 wt % to about 30 wt %, based on the total weight of the casting solution. In yet a further aspect, the second poly(aryl ether) is present in an amount of about 5 wt %, about 10 wt %, about 15 wt %, about 16 wt %, about 16.3 wt %, about 20 wt %, about 25 wt %, or about 30 wt %, based on the total weight of the casting solution.

In a further aspect, the second poly(aryl ether) comprises a repeating unit having a structure represented by a formula:

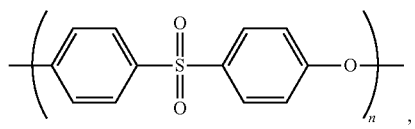

wherein n is an integer selected from 20 to 400. In a further aspect, n is selected from 20 to 350. In a still further aspect, n is selected from 20 to 300. In yet a further aspect, n is selected from 20 to 250. In an even further aspect, n is selected from 20 to 200. In a still further aspect, n is selected from 20 to 150. In yet a further aspect, n is selected from 20 to 100. In an even further aspect, n is selected from 20 to 50. In a still further aspect, n is selected from 50 to 400. In yet a further aspect, n is selected from 100 to 400. In an even further aspect, n is selected from 150 to 400. In a still further aspect, n is selected from 200 to 400. In yet a further aspect, n is selected from 250 to 400. In an even further aspect, n is selected from 300 to 400. In a still further aspect, n is selected from 350 to 400.

In a further aspect, the second poly(aryl ether) comprises a repeating unit having a structure represented by a formula:

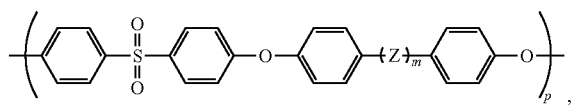

wherein p is an integer selected from 10 to 200; wherein m is selected from 0 and 1; and wherein Z is selected from —C(CH$_3$)$_2$—, —C(CF$_3$)$_2$—, —C(=O)—, and —O—.

In a further aspect, p is selected from 10 to 150. In a still further aspect, p is selected from 10 to 100. In yet a further aspect, p is selected from 10 to 50. In an even further aspect, p is selected from 50 to 200. In a still further aspect, p is selected from 100 to 200. In yet a further aspect, p is selected from 150 to 200.

In a further aspect, m is 0. In a still further aspect, m is 1.

In a further aspect, Z is selected from —C(CH$_3$)$_2$—, —C(CF$_3$)$_2$—, and —C(=O)—. In a still further aspect, Z is selected from —C(CH$_3$)$_2$—, —C(CF$_3$)$_2$—, and —O—. In yet a further aspect, Z is selected from —C(CH$_3$)$_2$—, —C(=O)—, and —O—. In an even further aspect, Z is selected from —C(CF$_3$)$_2$—, —C(=O)—, and —O—. In a still further aspect, Z is selected from —C(CH$_3$)$_2$— and —C(CF$_3$)$_2$—. In yet a further aspect, Z is selected from —C(=O)— and —O—. In an even further aspect, Z is —C(CH$_3$)$_2$—. In a still further aspect, Z is —C(CF$_3$)$_2$—. In yet a further aspect, Z is —C(=O)—. In an even further aspect, Z is —O—.

3. First Solvents

In one aspect, disclosed are methods comprising the step of combining the sulfonated poly(aryl ether) and a second poly(aryl ether) (PAE) to provide a casting solution, wherein combining is performed in a first solvent. In various aspects, the first solvent is a strong solvent. As used herein, the term "strong solvent" means a solvent that can dissolve greater than 99% poly(aryl ethers) and/or sulfonated poly(aryl ethers) in concentrations up to at least about 30 wt %, at least about 35 wt %, at least about 40 wt %, at least about 45 wt %, at least about 50 wt %, at least about 55 wt %, at least about 60 wt %, at least about 65 wt %, or at least about 70 wt %. In a still further aspect, the first solvent is highly soluble or miscible in water. Examples of solvents that are highly soluble or miscible in water include, but are not limited to, polar aprotic solvents such as N,N-dialkylamides and alkyl sulfoxides, which possess a polar C=O or S=O group, respectively, but do not contain an —OH, —NH, or —SH (protic) group.

Examples of first solvents include, but are not limited to, N,N-dimethylformamide, N,N-dimethylacetamide, N-methyl-2-pyrrolidinone, N-ethyl-2-pyrrolidinone, and dimethylsulfoxide, and mixtures thereof. In a still further aspect, the first solvent is N-methyl-2-pyrrolidinone.

In a further aspect, the first solvent is present in an amount of from about 20 wt % to about 40 wt %, based on the total weight of the casting solution. In a still further aspect, the first solvent is present in an amount of from about 20 wt % to about 35 wt %, from about 20 wt % to about 30 wt %, from about 20 wt % to about 25 wt %, from about 25 wt % to about 40 wt %, from about 30 wt % to about 40 wt %, or from about 35 wt % to about 40 wt %. In a still further aspect, the first solvent is present in an amount of about 20 wt %, about 25 wt %, about 26 wt %, about 30 wt %, about 35 wt %, about 36 wt %, about 36.6 wt %, or about 40 wt %.

4. Second Solvent

In one aspect, disclosed are methods comprising the step of combining the sulfonated poly(aryl ether) and a second poly(aryl ether) (PAE) to provide a casting solution, wherein combining is performed in a first solvent and a second solvent. In a further aspect, the second solvent is a weak solvent. As used herein, the term "weak solvent" means a solvent that dissolves less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % poly(aryl ethers) and/or sulfonated poly(aryl ethers). In a still further aspect, the second solvent is highly water soluble and/or water miscible. The second solvent need not be limited to an aprotic solvent, as some protic solvents can still be incorporated into the composition at relatively high concentrations due to compatibility with the polymers and with the first solvent mixture. Advantages of including a second solvent include, but are not limited to, a beneficial pore structure and higher retainment of the higher IEC sulfonated poly(aryl ether) within the resultant filtration membrane.

Examples of second solvents include, but are not limited to, diethylene glycol dimethyl ether, sulfolane, and triethyl phosphate, and mixtures thereof. In yet a further aspect, the second solvent is sulfolane.

In a further aspect, the second solvent is present in an amount of from about 40 wt % to about 60 wt %, based on the total weight of the casting solution. In a still further aspect, the second solvent is present in an amount of from about 40 wt % to about 55 wt %, from about 40 wt % to about 50 wt %, from about 40 wt % to about 45 wt %, from about 45 wt % to about 60 wt %, from about 50 wt % to about 60 wt %, or from about 55 wt % to about 60 wt %. In a still further aspect, the second solvent is present in an amount of about 40 wt %, about 45 wt %, about 45.1 wt %, about 50 wt %, about 55 wt %, or about 60 wt %.

C. Filtration Membranes

In one aspect, disclosed are membranes produced by a disclosed method. Thus, in various aspects, disclosed are membranes produced a method comprising the steps of: (a) sulfonating a first poly(aryl ether) to provide a sulfonated poly(aryl ether); (b) combining the sulfonated poly(aryl ether) and a second poly(aryl ether) to provide a casting solution; and (c) casting the solution to provide a filtration membrane, wherein the sulfonated poly(aryl ether) is not isolated prior to casting the membrane.

In various aspects, a disclosed filtration membrane has a molecular weight cutoff of from about 3,000 to about 30,000 Daltons, from about 3,000 to about 25,000 Daltons, from about 3,000 to about 20,000 Daltons, from about 3,000 to about 15,000 Daltons, from about 3,000 to about 10,000 Daltons, from about 3,000 to about 5,000 Daltons, from about 5,000 to about 30,000 Daltons, from about 10,000 to about 30,000 Daltons, from about 15,000 to about 30,000 Daltons, from about 20,000 to about 30,000 Daltons, or from about 25,000 to about 30,000 Daltons.

In various aspects, a disclosed filtration membrane can achieve a pure water hydraulic permeability of from about 125 liters per hour per square meter per bar to about 300 liters per hour per square meter per bar, from about 150 liters per hour per square meter per bar to about 300 liters per hour per square meter per bar, from about 175 liters per hour per square meter per bar to about 300 liters per hour per square meter per bar, from about 200 liters per hour per square meter per bar to about 300 liters per hour per square meter per bar, from about 225 liters per hour per square meter per bar to about 300 liters per hour per square meter per bar, from about 250 liters per hour per square meter per bar to about 300 liters per hour per square meter per bar, from about 275 liters per hour per square meter per bar to about 300 liters per hour per square meter per bar, from about 125 liters per hour per square meter per bar to about 275 liters per hour per square meter per bar, from about 125 liters per hour per square meter per bar to about 250 liters per hour per square meter per bar, from about 125 liters per hour per square meter per bar to about 225 liters per hour per square meter per bar, from about 125 liters per hour per square meter per bar to about 200 liters per hour per square meter per bar, from about 125 liters per hour per square meter per bar to about 175 liters per hour per square meter per bar, or from about 125 liters per hour per square meter per bar to about 150 liters per hour per square meter per bar.

In various aspects, a disclosed filtration membrane has a protein sieving coefficient of from about 0.001 to about 0.005, from about 0.002 to about 0.005, from about 0.003 to about 0.005, from about 0.004 to about 0.005, from about 0.001 to about 0.004, from about 0.001 to about 0.003, or from about 0.001 to about 0.002.

In various aspects, a disclosed filtration membrane has a negative charge of from about 0.5 milliequivalents per square meter to about 2.0 milliequivalents per square meter, from about 0.5 milliequivalents per square meter to about 1.5 milliequivalents per square meter, from about 0.5 milliequivalents per square meter to about 1.0 milliequivalents per square meter, from about 1.0 milliequivalents per square meter to about 2.0 milliequivalents per square meter, or from about 1.5 milliequivalents per square meter to about 2.0 milliequivalents per square meter.

In various aspects, a disclosed filtration membrane has a negative charge of about 0.5 milliequivalents per square meter, of greater than about 1.25 milliequivalents per square meter, of greater than about 2.5 milliequivalents per square meter, or of greater than about 5 milliequivalents per square meter, In various aspects, a disclosed filtration membrane can offer several advantages over other filtration membranes. For example, the use of a disclosed filtration membrane can reduce dairy feed protein passage by up to 10%, up to 20%, up to 40%, up to 60%, up to 80%, or up to 100%. An additional advantage of the disclosed filtrations membrane exists in that it can provide increased permeate flow rate on the aforementioned dairy feed by up to 10%, up to 20%, up to 40%, up to 60%, up to 90%, or up to 120%.

In a further aspect, a disclosed filtration membrane can reduce dairy feed protein passage by 60%. In a still further aspect, a disclosed filtration membrane can reduce the dairy feed protein passage by 50%. In yet a further aspect, a disclosed filtration membrane can reduce the dairy feed protein passage by 40%. In an even further aspect, a disclosed filtration membrane can reduce the dairy feed protein passage by 30%. In a still further aspect, a disclosed filtration membrane can reduce the dairy feed protein passage by 20%. In yet a further aspect, a disclosed filtration membrane can reduce the dairy feed protein passage by 10%.

In a further aspect, a disclosed filtration membrane can increase dairy feed permeate flow rate by 60%. In still further aspect, a disclosed filtration membrane can increase dairy feed permeate flow rate by 50%. In yet a further aspect, a disclosed filtration membrane can increase the dairy feed permeate flow rate by 40%. In an even further aspect, a disclosed filtration membrane can increase the dairy feed permeate flow rate by 30%. In a still further aspect, a disclosed filtration membrane can increase the dairy feed permeate flow rate by 20%. In yet a further aspect, a disclosed filtration membrane can increase the dairy feed permeate by 10%.

D. Methods for Concentrating a Dairy Protein

In one aspect, disclosed are methods for concentrating dairy proteins, the method comprising the steps of: (a) providing a dairy product containing one or more dairy proteins; and (b) filtering the dairy product through a disclosed membrane or a membrane prepared by a disclosed method. In a further aspect, the disclosed method results in a dairy protein concentrate. In a still further aspect, the disclosed method results in a milk protein concentrate.

In a further aspect, the disclosed method results in a dairy product that contains of from about 40 wt % to about 90 wt % dairy protein, from about 40 wt % to about 80 wt % dairy protein, from about 40 wt % to about 70 wt % dairy protein, from about 40 wt % to about 60 wt % dairy protein, from about 40 wt % to about 50 wt % dairy protein, from about 50 wt % to about 80 wt % dairy protein, from about 60 wt % to about 80 wt % dairy protein, or from about 70 wt % to about 80 wt % dairy protein. In a still further aspect, the dairy protein is milk protein.

In a further aspect, the disclosed method results in a dairy product having a high-protein low-lactose ratio in the range of from about 10 to about 50, from about 10 to about 40, from about 10 to about 30, from about 10 to about 20, from about 20 to about 50, from about 30 to about 50, or from about 40 to about 50.

In a further aspect, the disclosed method results in a dairy product having a fat level of less than about 10%, less than about 9%, less than about 7%, less than about 5%, less than about 3%, or less than about 1%.

In a further aspect, the dairy product is a cow-based dairy product. In a still further aspect, the dairy product is a milk, a whey, or a serum.

In a further aspect, the dairy product is selected from skim milk, butter milk, and whey.

In a further aspect, the one or more dairy proteins are selected from casein, beta-lactoglobulin, alpha-lactalbumin, glycomacropeptide, immunoglobulin A, immunoglobulin M, a glycomacropeptide, bovine serum albumin, lactoferrin, lactoperoxidase, immunoglobulin G, and lysozyme, or mixtures thereof.

Examples of dairy proteins that can be found in milk include, but are not limited to, caseins and whey proteins (e.g., beta-lactoglobulin and alpha-lactalbumin). Milk proteins can be identified by molecular mass. The relative size of the caseins (~ 25-35 kDa) is distinguished from the major whey proteins beta-lactoglobulin (18.4 kDa) and alpha-lactalbumin (14.2 kDa). Others include primarily lactoferrin (~ 80 kDa) and serum albumin (~ 66 kDa).

E. Methods for Filtering Dairy Products

In one aspect, disclosed are methods comprising filtering a dairy product through a disclosed membrane or a membrane prepared by a disclosed method, to provide a permeate and a retentate.

In a further aspect, the dairy product is a cow-based dairy product.

In a further aspect, the dairy product is selected from skim milk, butter milk, and whey.

In a further aspect, the method further comprises the step of mixing the permeate with lactase.

In a further aspect, the method further comprises the step of concentrating the permeate to provide a dried permeate. In a still further aspect, the method further comprises the step of reconstituting the dried permeate to provide a reconstituted dairy product.

In a further aspect, the method further comprises the step of concentrating the retentate to provide a dried retentate. In a still further aspect, the method further comprises the step of reconstituting the dried retentate to provide a reconstituted dairy product.

1. Permeates

In one aspect, disclosed are permeates produced by a disclosed method. In a further aspect, the permeate is a dairy permeate. In a still further aspect, the permeate is a milk permeate.

Permeate is a high-lactose dairy ingredient produced through the removal of protein and other solids from milk or whey. Without wishing to be bound by theory, permeate often has salty flavor enhancement characteristics, making it an ideal replacement for more costly ingredients while maintaining consumer-acceptable flavor. In addition, as consumers look to reduce their sodium intake, permeate shows great promise for a wide range of formulations, including bakery, soup, prepared meals, and more. Finally, the high lactose in permeate can contribute to the browning appearance and pleasant caramelized aroma of baked goods.

In a further aspect, the permeate is dried (e.g., via spray drying) to produce a dried permeate. In a still further aspect, the dried permeate is a powder. In yet a further aspect, the dried permeate is reconstituted to provide a reconstituted dairy product.

In a further aspect, the dried permeate has a moisture content of less than about 15 wt %, less than about 10 wt %, less than about 7 wt %, less than about 5 wt %, or less than about 3 wt %.

In a further aspect, the permeate comprises one or more dairy proteins. In a still further aspect, the dairy proteins are milk serum proteins. In yet a further aspect, the milk serum proteins do not include glycomacropeptide. In an even further aspect, the dairy proteins are casein. In yet a further aspect, the dairy proteins are whey proteins. In an even further aspect, the dairy proteins are not whey proteins.

In various aspects, the permeate comprises one or more of lactose, protein, fat, and ash. Thus, in various aspects, the permeate comprises lactose. For example, the permeate can comprise at least 50 wt %, at least 60 wt %, at least 70 wt %, at least 80 wt %, or at least 90 wt % lactose.

2. Retentates

In one aspect, disclosed are retentates produced by a disclosed method. In a further aspect, the retentate is a dairy retentate. In a still further aspect, the retentate is a milk retentate.

In general, there are three main types of milk retentates. Whey protein isolates, which have no casein proteins, are typically accessed by ultrafiltering the liquid removed during the process of making cheese. In contrast, micellar casein isolates, which have no whey protein, are typically achieved via microfiltration rather than ultrafiltration, using a membrane filter with pores large enough to retain the micelles (casein) while allowing most other components to pass through. Micellar casein comprises the major proteins of milk, the casein proteins, and a major portion of the calcium and magnesium phosphate from milk. The whey proteins or serum proteins of milk are removed along with the lactose and soluble minerals because these proteins, sugars, and minerals are small enough to pass through the pores of the microfilter. Finally, a third type of retentate contains both casein and whey proteins. Such a retentate is typically made using a membrane filter that allows neither casein nor whey to pass through. One such filter that is used is a membrane filter having a molecular weight cut-off of about 10,000. When milk is ultrafiltered using a 10,000 MWCO membrane, all of the proteins and fat globules are retained, and the milk sugar, lactose, and the soluble minerals (sodium and potassium salts) pass through the membrane. Most of the calcium salts are closely associated with the proteins so these salts are mostly retained, depending on the pH and other treatments that may dissociate the calcium away from the proteins. In this product, the caseins remain in micelles and the whey proteins remain loose, unassociated and soluble. Thus, the make-up of the retentate is largely dictated by the pore size of the filtration membrane used.

In a further aspect, the retentate is dried (e.g., via spray drying) to produce a dried retentate. In a still further aspect, the dried retentate is a powder. In yet a further aspect, the dried retentate is reconstituted to provide a reconstituted dairy product.

In a further aspect, the dried retentate has a moisture content of less than about 15 wt %, less than about 10 wt %, less than about 7 wt %, less than about 5 wt %, or less than about 3 wt %.

In a further aspect, the retentate comprises one or more dairy proteins. In a still further aspect, the dairy proteins are milk whey proteins. In an even further aspect, the dairy proteins are casein. In yet a further aspect, the dairy proteins are whey proteins. In an even further aspect, the dairy proteins are a mixture of casein and whey proteins. In a still further aspect, the whey protein and casein are bound together in protein aggregates. In yet a further aspect, the whey protein and casein are not bound together in protein aggregates.

In a further aspect, the retentate comprises lactose in an amount of less than about 10 wt %, less than about 8 wt %, less than about 6 wt %, less than about 4 wt %, or less than about 2 wt %, based on the total protein content in the retentate.

In a further aspect, lactase is added to the retentate, thereby reducing the amount of lactose in the retentate.

In a further aspect, the retentate has a total protein content of from about 65 wt % to about 80 wt %, based on the total weight of the retentate. In a still further aspect, the retentate has a total protein content of from about 65 wt % to about 75 wt %, from about 65 wt % to about 70 wt %, from about 70 wt % to about 80 wt %, or from about 75 wt % to about 85 wt %.

3. Reconstituted Dairy Products

In one aspect, disclosed are reconstituted dairy products produced by a disclosed method. Examples of reconstituted dairy products include, but are not limited to, milk, cheese, yogurt, ice cream, and animal feed. Thus, in various aspects, the reconstituted dairy product is selected from milk, cheese, yogurt, and ice cream. In a further aspect, the reconstituted dairy product is animal feed.

The foregoing description illustrates and describes the disclosure. Additionally, the disclosure shows and describes only the preferred embodiments but, as mentioned above, it is to be understood that it is capable to use in various other combinations, modifications, and environments and is capable of changes or modifications within the scope of the invention concepts as expressed herein, commensurate with the above teachings and/or the skill or knowledge of the relevant art. The embodiments described herein above are further intended to explain best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended to the appended claims be construed to include alternative embodiments.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

F. Examples

The disclosed negatively charged ultrafiltration membranes are produced by mixing sulfonated polymers mixed with non-sulfonated poly(aryl ethers) to form a polymer blend, which is then dissolved in solvents containing an ionic pre-precipitation agent and cast via the phase inversion process. These highly chemically resistant membranes have molecular weight cut offs (MWCO) typically ranging from 3,000 to 30,000 Daltons, making them ideal for dairy protein separation. Since bovine-0 casein present in milk has a molecular weight of 23,600 Daltons and an isoelectric point of 4.6, its' size and negative charge allows for both high retention and minimal fouling when processed by the disclosed ultrafiltration membranes. Dairy whey tests of the disclosed membranes demonstrate significant improvements to permeability and/or protein retention compared to membranes conventionally used in dairy filtration.

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The Examples are provided herein to illustrate the invention, and should not be construed as limiting the invention in any way. Examples are provided herein to illustrate the invention and should not be construed as limiting the invention in any way.

1. Membrane Preparation a. Sulfonation Reaction (A1)

10.35 g of polyethersulfone (PES) (BASF Ultrason E) was placed in a stoppered 125 mL Erlenmeyer flask containing 70 g of anhydrous sulfolane with a magnetic stir bar. This flask was heated at 130° C. in a glycerin bath on top of a magnetic stirring hotplate for 1 hour, at which point all of the PES was dissolved. 4.8 mL of fuming sulfuric acid (Alfa Aesar 18-24% free $SO_3$) was added into this solution over approximately 4 minutes at a temperature range of 127-134° C. The reaction solution was stirred further for 1 hour while maintaining this temperature. This clear, brownish-colored solution was removed from the heating bath and allowed to cool at room temperature. A sample of this solution was precipitated in deionized water and washed several times, then dried 3½ hours at 105-110° C. The final sulfonated product (SPES) had an ion exchange capacity (IEC) of 0.97 meg/g.

b. Sulfonation Reaction (A2)

An identical 100× scale-up sulfonation reaction to A1 was performed, except that 166× fuming sulfuric acid was used at a temperature range of 60–60° C. for 1 hour and 50 minutes and 376 g of NMP solvent was added at the end of the reaction. A sample of this solution was precipitated in deionized water, then washed and dried as before. The final sulfonated SPES product had an IEC of 0.99 meg/g.

c. Preparation of Casting Solutions (B1)

81.5 g PES was dissolved in 183 g of N-methyl-2-pyrrolidinone (NMP) as one of the components of the casting solution. To this was added directly 39.8 g of the above sulfonation reaction solution, 194.4 g sulfolane, and 1.31 g concentrated sulfuric acid, to give a final 500 g casting solution formulation consisting of 16.3% PES, 1% SPES, 36.6% NMP, 45.1% Sulfolane, and 1% $H_2SO_4$ (Formulation 21 in Table 1). Control solution: A state of the art similar casting solution to the one above was prepared as a control solution, with the exception that no sulfonation reaction solution was added.

d. Preparation of Casting Solutions (B2)

An identical 135× scale up casting solution to B1 was prepared directly from the A2 reaction solution (Formulation no. 21 SU).

e. Casting Uf Membranes

Formulation no. 21, as shown in Table 1 below, as well as Formulation no. 21 I, Formulation no. 21 SU, and the control formulation were all cast into UF membranes on polyester paper using the production method given in Table 2.

TABLE 1

| No. | PES wt/% | SPS wt/% | IEC meq/g | SPES wt/% | IEC meq/g | NMP wt/% | Sulfolane wt/% | Sulfuric Acid wt/% |
|---|---|---|---|---|---|---|---|---|
| 1 | 21.5 | .90 | 2.3 | — | — | 22.4 | 55.2 | — |
| 2 | 21.5 | .45 | 2.3 | — | — | 22.6 | 55.5 | — |
| 3 | 22.5 | .90 | 2.3 | — | — | 22.1 | 54.5 | — |
| 4 | 21.5 | 1.34 | 2.3 | — | — | 22.3 | 54.9 | — |
| 5 | 18.3 | .90 | 2.3 | — | — | 36.2 | 44.6 | — |
| 6 | 19.8 | .90 | 1.8 | — | — | 35.6 | 43.7 | — |
| 7 | 19.8 | .90 | 0.7 | — | — | 35.6 | 43.7 | — |
| 8 | 19.8 | — | — | .90 | .90 | 35.6 | 43.7 | — |
| 9 | 19.8 | — | — | .90 | 2.0 | 35.6 | 43.7 | — |
| 10 | 19.8 | — | — | .90 | 3.9 | 35.6 | 43.7 | — |
| 11 | 20.5 | — | — | 2.00 | 3.9 | 34.8 | 42.7 | — |
| 12 | 21.5 | — | — | 1.00 | 3.9 | 34.8 | 42.7 | — |
| 13 | 20.5 | — | — | 2.00 | 3.0 | 34.8 | 42.7 | — |
| 14 | 17.8 | — | — | 1.45 | .9 | 36.2 | 44.5 | — |
| 15 | 17.6 | — | — | 2.33 | 2.1 | 35.9 | 44.2 | — |
| 16 | 18.4 | — | — | .90 | .90 | 36.2 | 44.5 | — |
| 17 | 18.3 | — | — | .90 | 1.4 | 36.2 | 44.6 | — |
| 18 | 18.3 | — | — | .90 | .80 | 36.2 | 44.6 | — |
| 19 | 19.9 | — | — | .83 | 1.2 | 26.2 | 53.1 | — |
| 20 | 16.3 | — | — | 2.00 | .90 | 36.2 | 44.5 | 1.0 |
| 21 | 16.3 | — | — | 1.00 | .97 | 36.6 | 45.1 | 1.0 |
| 22 | 15.3 | — | — | 2.00 | .90 | 36.6 | 45.1 | 1.0 |
| 23 | 13.7 | — | — | 4.60 | 1.0 | 36.2 | 44.5 | 1.0 |
| 24 | 22.8 | — | — | 1.20 | 1.0 | 75.0 | — | 1.0 |
| 25 | 21.6 | — | — | 2.40 | 1.0 | 75.0 | — | 1.0 |
| 26 | 18.0 | — | — | 6.00 | 1.0 | 75.0 | — | 1.0 |
| 27 | 12.0 | — | — | 12.0 | 1.0 | 75.0 | — | 1.0 |
| 28 | 0 | — | — | 24.0 | 1.0 | 75.0 | — | 1.0 |

TABLE 2

| Method | Configuration | mil Knife gap | fpm Casting Speed | Quench Bath Temp (° C.)/ Time (min) | Rinse Bath Temp (° C.)/ Time (min) | Rinse Bath Temp (° C.)/ Time (min) |
|---|---|---|---|---|---|---|
| Laboratory | Batch | Knife over plate (moving knife) | 7 | 17.5 | 6-8/.5 | 20-25/.5 | 50-55/1.5 |
| Production | Continuous | Knife over roller (moving web) | 7 | 15 | 6-8/.5 | 20-25/.5 | 50-55/1.5 |

2. Evaluation of Uf Membranes

Testing of the UF membranes is performed on pressurized cross-flow test cells with circular active area diameter of four inches. The membrane samples are first tested on a single strength whey (SSW, reconstituted Kraft whey powder=6.3% protein) at 50° C. temperature and 40 psig applied pressure. Permeate samples are collected after 15 minutes of run time then measured for amount/time–area expressed as 27 psi normalized flux in gallons/ft$^2$-day (gfd). Protein concentration is measured using a QuantiT™ protein assay kit together with the Qubit® (Life Sciences) fluorometer and is expressed in parts per million (ppm).

The membranes are left in place in the test cells and then tested on whey protein concentrate (WPC: reconstituted Jarrow protein powder=16.5% protein) at approximately 55° C. temperature and 80 psig applied pressure. Permeate samples are collected after 30 minutes of run time and measured in the same manner as discussed above except that the flux is normalized to 72 psi.

The results of testing on the two whey protein feeds for the control UF membrane and the formulation no. 21 membrane of the invention are given in Table 3. Without wishing to be bound by theory, it should be noted that the goal of UF membrane performance is to increase permeate flux and/or decrease permeate protein concentration.

TABLE 3

| Formulation No. | PES wt % | SPES wt % | H$_2$SO$_4$ wt % | SSW | | WPC | |
|---|---|---|---|---|---|---|---|
| | | | | Flux (gfd) | Permeate Protein (PPM) | Flux (gfd) | Permeate Protein (PPM) |
| Control | 18.3 | — | — | 12.9 | 128 | 5.5 | 289 |
| 21 | 16.3 | 1.0 | 1.0 | 18.9 | 120 | 9.9 | 320 |
| Relative Performance Factor | | | | 1.5 | | 1.8 | |

Table 4 gives representative test results of formulation 21 I UF membrane, wherein the sulfonated poly (arylether) was isolated, washed, and dried, prior to preparing the casting solution and casting into a membrane.

TABLE 4

| Formulation No. | PES wt % | SPES wt % | H2SO4 wt % | SSW Flux (gfd) | Permeate Protein (ppm) | Flux (gfd) | WPC Permeate Protein (ppm) |
|---|---|---|---|---|---|---|---|
| 21 I | 16.3 | 1 | 1 | 18.8 | 123 | 10.2 | 272 |

In comparing the test performances of Formulations 21 and 21 I in Tables 3 and 4, respectively, it is clear that the non-isolated sulfonated poly (aryl ether) membrane performs equivalently to the isolated case membrane.

A 300 meter length of Formulation 21 SU membrane was sampled and loaded onto test cells alongside with control membrane and given a hot water pretreatment consisting of 60-70° C. and 30 psi pressure for 60 minutes. Immediately following this, the membranes were given the standard regimen of whey tests, with results given in Table 5.

TABLE 5

| Formulation No. | PES wt % | SPES wt % | H2SO4 wt % | SSW Flux (gfd) | Permeate Protein (ppm) | Flux (gfd) | WPC Permeate Protein (ppm) |
|---|---|---|---|---|---|---|---|
| Control | 18.3 | — | — | 8.6 | 141 | 6.12 | 276 |
| 21 SU | 16.3 | 1 | 1 | 12.7 | 106 | 7.83 | 208 |
| Relative Performance Factor | | | | 1.5 | | 1.3 | .75 |

As can be seen in Table 5, the sulfonated poly (arylether) membrane has retained its advantageous performance relative to the control, even after hot water exposure.

Without wishing to be bound by theory, the substitution of sulfonated polyethersulfone for a portion of the standardly used polyethersulfone in the casting solution results in a significantly improved dairy whey separation UF membrane. Testing on SSW produced permeates of 50% higher flux with similar or reduced protein concentration while testing on WPC produced permeates of 30-80% higher flux with similar or reduced protein concentration.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
  (a) sulfonating a first poly(aryl ether) to provide a sulfonated poly(aryl ether);
  (b) combining the sulfonated poly(aryl ether) and a second poly(aryl ether) to provide a casting solution; and
  (c) casting the solution to provide a filtration membrane, wherein the sulfonated poly(aryl ether) is not isolated prior to casting the membrane.

2. The method of claim 1, wherein the filtration membrane is an ultrafiltration membrane.

3. The method of claim 1, wherein sulfonating is performed with fuming sulfuric acid in sulfolane.

4. The method of claim 1, wherein combining is performed in a first solvent.

5. The method of claim 4, wherein the first solvent is present in an amount of from about 20 wt % to about 40 wt %, based on the total weight of the casting solution.

6. The method of claim 4, wherein the first solvent is selected from N,N-dimethylformamide, N,N-dimethylacetamide, N-methyl-2-pyrrolidinone, N-ethyl-2-pyrrolidinone, and dimethylsulfoxide, or a mixture thereof.

7. The method of claim 4, wherein combining is further performed in a second solvent.

8. The method of claim 7, wherein the second solvent is selected from diethylene glycol dimethyl ether, sulfolane, and triethyl phosphate, or a mixture thereof.

9. The method of claim 7, wherein combining is further performed with sulfuric acid.

10. The method of claim 9, wherein the sulfuric acid is present in an amount of from about 0.1 wt % to about 10 wt %, based on the total weight of the casting solution.

11. The method of claim 1, wherein the first poly(aryl ether) and the second poly(aryl ether) are independently selected from polysulfone and polyether sulfone.

12. The method of claim 1, wherein the sulfonated poly(aryl ether) is present in an amount of from about 0.1 wt % to about 30 wt %, based on the total weight of the casting solution.

13. The method of claim 1, wherein the sulfonated poly(aryl ether) has an ion exchange capacity of from about 0.1 meq/g to about 5.0 meq/g.

14. The method of claim 1, wherein the sulfonated poly(aryl ether) comprise a repeating unit having a phenyl group, wherein at least one phenyl group is substituted with a sulfonic acid group.

15. The method of claim 14, wherein the sulfonic acid group has a formula—$SO_3R^1$, wherein $R^1$ is selected from hydrogen, an alkali metal salt, and a nitrogen-containing salt derived from ammonium or amine.

16. The method of claim 1, wherein from about 0.01 to about 1.0 molar groups of the phenyl group are substituted with a sulfonic acid group.

17. The method of claim 1, wherein the second poly(aryl ether) is present in an amount of from about 5 wt % to about 30 wt %, based on the total weight of the casting solution.

18. The method of claim 1, wherein the second poly(aryl ether) comprises a repeating unit having a structure represented by a formula:

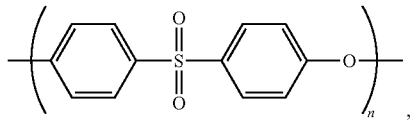

wherein n is an integer selected from 20 to 400.

19. The method of claim 1, wherein the second poly(aryl ether) comprises a repeating unit having a structure represented by a formula:

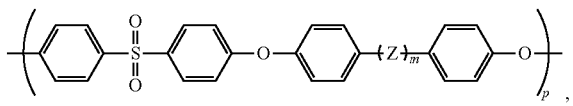

wherein p is an integer selected from 10 to 200;

wherein m is selected from 0 and 1; and wherein Z is selected from —$C(CH_3)_2$—, —$C(CF_3)_2$—, —C(=O)—, and —O—.

20. A method comprising:

(a) sulfonating polyether sulfone to provide sulfonated polyether sulfone, wherein sulfonating is performed with fuming sulfuric acid in sulfolane;

(b) combining the sulfonated polyether sulfone and polyether sulfone in N-methyl-2-pyrrolidinone and sulfolane with concentrated sulfuric acid to provide a casting solution; and (c) casting the solution to provide an ultrafiltration membrane, wherein sulfonated polyether sulfone is not isolated prior to casting the ultrafiltration membrane.

* * * * *